United States Patent
Davis

[15] 3,694,599
[45] Sept. 26, 1972

[54] APPARATUS FOR DIGITALLY CONTROLLING THE MAGNITUDE OF A MACHINING GAP IN AN EDM PROCESS

[72] Inventor: Malcolm F. Davis, Cincinnati, Ohio

[73] Assignee: Cincinnati Milacron Inc., Cincinnati, Ohio

[22] Filed: Nov. 8, 1971

[21] Appl. No.: 196,272

[52] U.S. Cl. ..............................219/69 G, 219/69 C
[51] Int. Cl. ............................B23p 1/08, B23p 1/14
[58] Field of Search ..........................219/69 C, 69 G

[56] References Cited

UNITED STATES PATENTS 3,340,478 9/1967 Poerschke............219/69 G X
3,381,107 4/1968 Poerschke................219/69 G Primary Examiner—R. F. Staubly
Attorney—Howard T. Keiser et al.

[57] ABSTRACT

An apparatus is disclosed for detecting the exclusive occurrence of a voltage pulse or a current pulse during an EDM machining process. A machining gap is decreased a predetermined increment in response to a predetermined number of consecutive occurrences of only voltage pulses. Further, the machining gap is increased a number of predetermined increments in response to a predetermined number of consecutive occurrences of only current pulses; and finally, the machining process is terminated in response to the gap increasing in magnitude.

4 Claims, 5 Drawing Figures

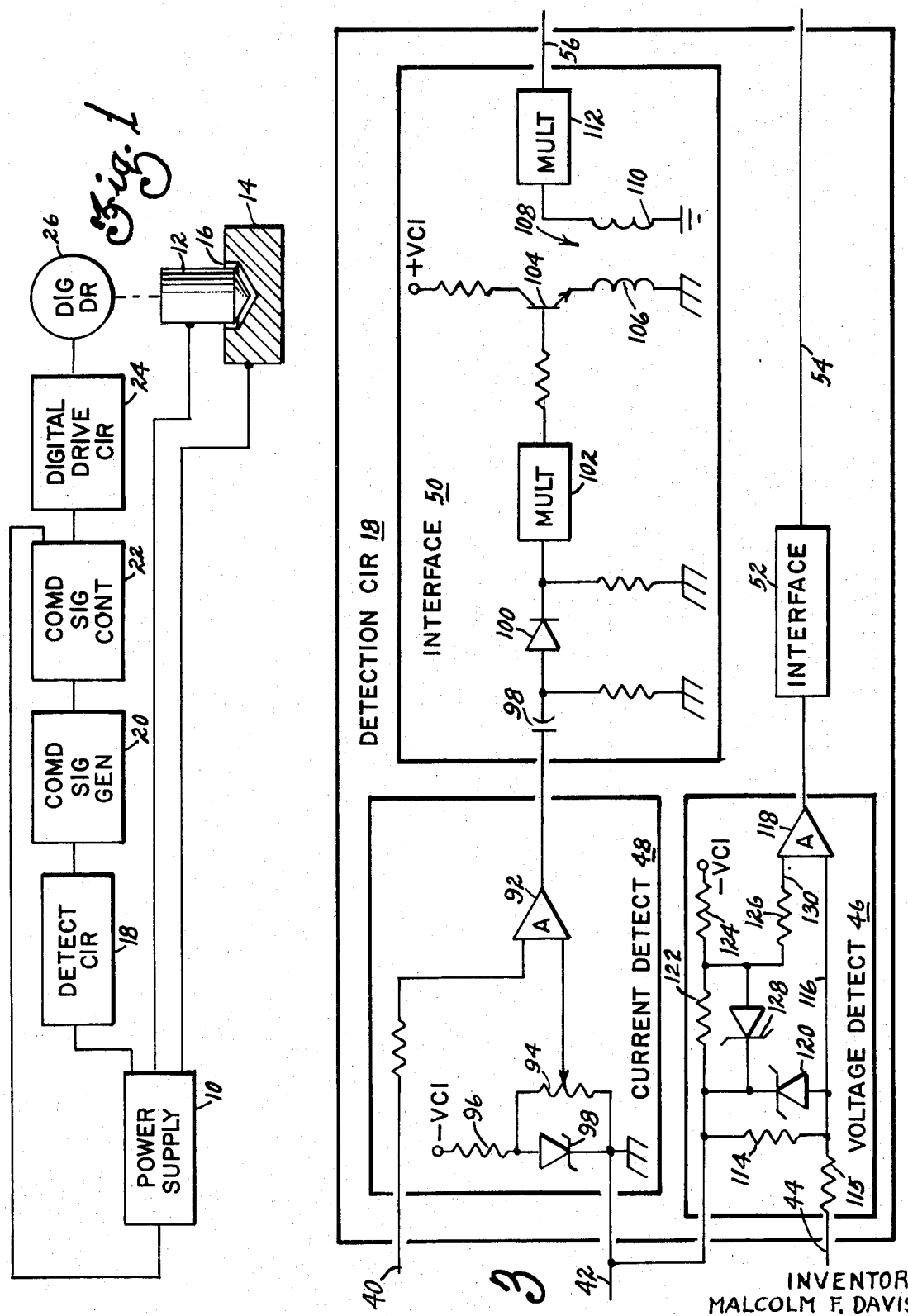

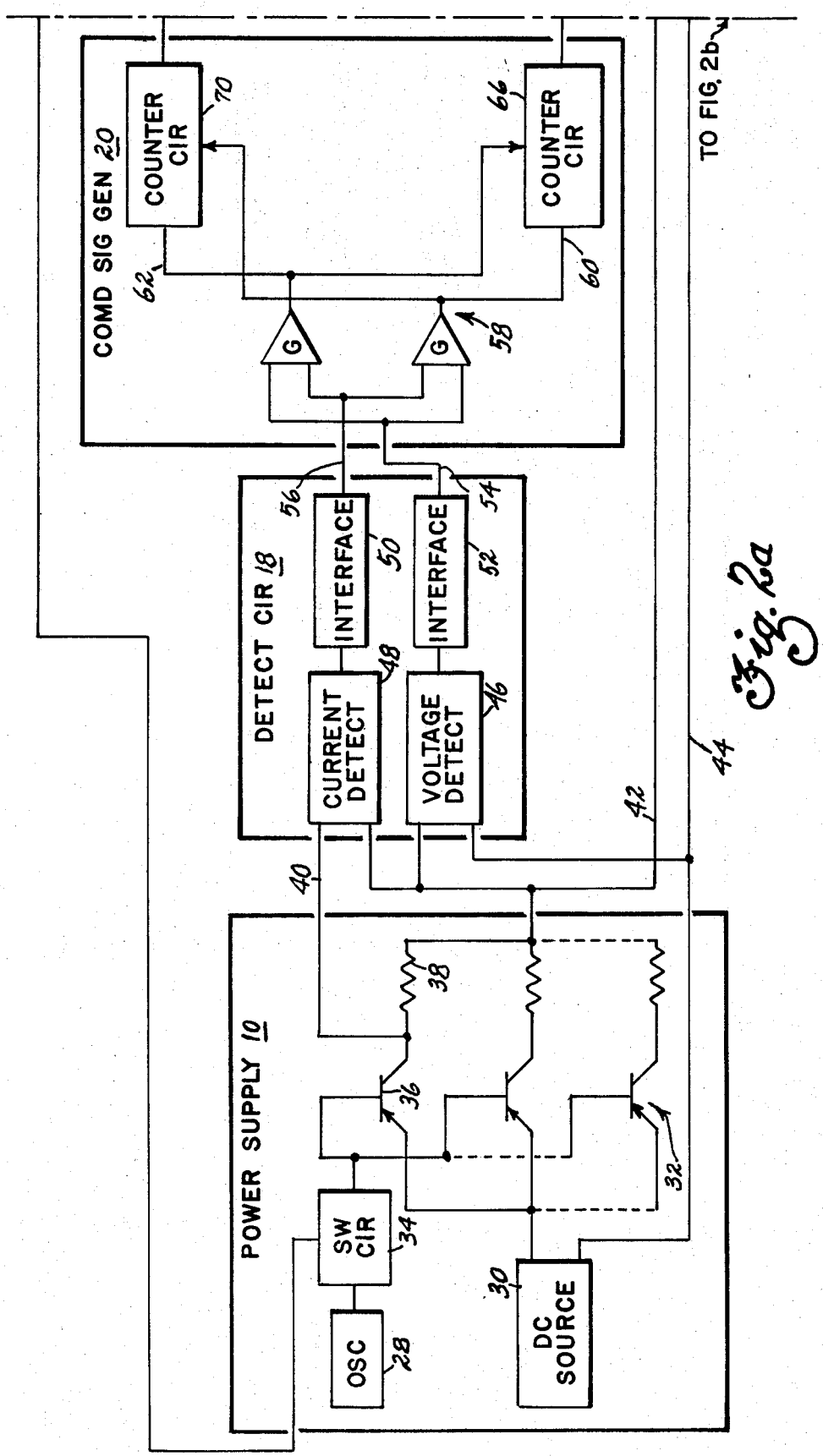

3,694,599

APPARATUS FOR DIGITALLY CONTROLLING THE MAGNITUDE OF A MACHINING GAP IN AN EDM PROCESS

BACKGROUND OF THE INVENTION

Generally, the invention relates to the area of servomechanism control of a machining gap in an EDM process. Specifically, the invention provides an improved digital servo-mechanism control of the machining gap.

The prior art contains several examples of digital servomechanisms as applied to EDM machines. Consequently, the advantages of such servomechanisms is thoroughly discussed in the art; and there is no need to repeat these arguments. In addition, the prior art contains examples of detecting both current and voltage levels during the machining process and controlling the servomechanism therewith. In these systems, the servomechanism is corrected on a pulse by pulse basis each time a defined error condition exists. Further, the servomechanism correction is a fixed increment for all error conditions defined. As will be explained below, because of the inherent instability and unpredictability of the EDM process, applicant does not believe the prior art systems give the most efficient machining process.

In the EDM process, a voltage pulse is provided by a power supply connected across a machining gap formed in a dielectric medium between an electrically conductive tool and an electrically conductive workpiece. When the impedance in the machining gap is proper, an electrical discharge or current pulse will pass thereacross thereby removing material from the workpiece. For purposes of this disclosure, when a discharge occurs, the voltage and current pulses are defined to be in the one state. It should be noted that in the following circuits, as in all digital circuits in general, the voltage and current pulses are defined to be in the one state in response to an arbitrary minimum voltage or current level, respectively. Because of the continuously changing conditions in the machining gap, a situation may occur where the current pulse is in the one state; and the voltage pulse is absent or in the zero state. This situation defines a short circuit across the gap or a no discharge condition. Conversely, when the current is in the zero state, and the voltage is in the one state, a no discharge condition exists; however, this condition is defined as an open circuit. Experience has shown that a great many times a short circuit or open circuit may occur on a few successive pulses and then disappear. Therefore, these apparent error conditions are not really indicative of either too small or too large a machining gap. However, by responding to each error condition the prior art servomechanism controls do not allow for this possibility.

Another apparent error condition occurs a significant percentage of the time in certain applications. This condition is defined by a machining process having initial current and voltage pulses defining an open or a short circuit. However, before the voltage pulse expires, the error condition clears itself; and a normal discharge occurs for the duration of the pulse. This is called a delayed discharge. In the above situation, the prior art devices recognize a delayed discharge as an error condition; and corrective action is taken. Such corrective action normally involves the servomechanism; and consequently, a substantial amount of valuable machining time is consumed in correcting errors which would be self-correcting in much less time.

Applicant discloses a circuit which gives the EDM process an opportunity to clear itself of certain error conditions before corrective action is taken. Further, in contrast to the prior art, the corrective action of applicant's circuit distinguishes between the error conditions which exist.

SUMMARY OF THE INVENTION

Applicant claims an apparatus for controlling a digital drive circuit which is connected to a digital driving mechanism for producing relative motion between an electrically conductive tool and an electrically conductive workpiece positioned to form a machining gap therebetween. The machining gap has current pulses periodically passed thereacross in response to voltage pulses being provided by a power supply. Means are connected to the power supply for detecting the voltage and current pulses. Further, means are connected to the detecting means for generating a retract signal in response to a predetermined number of only current pulses; and an advance signal in response to a predetermined number of only voltage pulses. Finally, means are connected from the generating means to the digital drive circuits and the power supply for producing a first command signal to the digital drive circuit in response to the retract signal for moving the tool a predetermined number of digital increments away from the workpiece. A second command signal is produced in response to the advance signal for moving the tool a digital increment toward the workpiece, and the power supply is responsive to a control signal which is produced in response to the retract signal for terminating the voltage pulses from the power supply.

BRIEF DESCRIPTION OF THE DRAWINGS

FIG. 1 is a general block diagram of applicant's invention.

FIGS. 2a and 2b when joined along the indicated junction line comprise a detailed block diagram of one embodiment of applicant's invention.

FIG. 3 is a detailed schematic diagram of several elements defined in the preferred embodiment.

DESCRIPTION OF THE PREFERRED EMBODIMENT

Figure 2B:
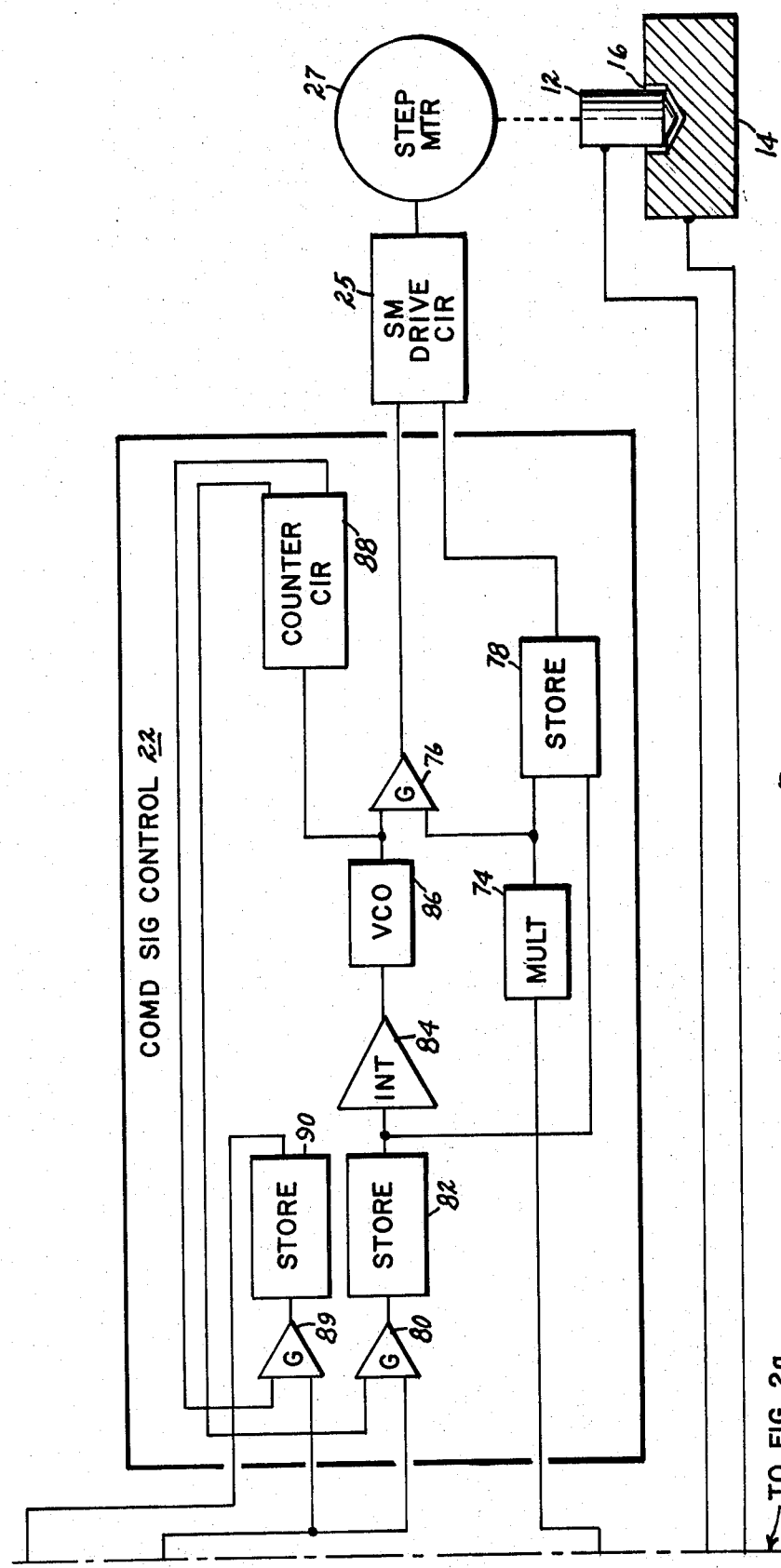

FIG. 1 is a general block diagram illustrating the elements of applicant's invention. An EDM power supply 10 produces voltage pulses to a machining gap 16 formed between an electrically conductive tool 12 and an electrically conductive workpiece 14. Under proper conditions, the voltage pulses are operative to produce electrical discharges or current pulses across the machining gap 16. Connected to the power supply 10 is a detection circuit 18 which is operative to detect the voltage pulses and current pulses from the power supply. A command signal generator 20 which is coupled to the detection circuit 18 is responsive to the exclusive occurrence of a predetermined number of consecutive voltage pulses for producing an advance signal. The generator 20 is also responsive to the exclusive occurrence of a predetermined number of consecutive current pulses for producing a retract signal. A command signal control 22 is responsive to the advance signal for producing command signals to a digital drive circuit 24 which are operative to energize a digital driving mechanism 26 and move the tool 12 toward the workpiece 14 a predetermined increment thereby decreasing the magnitude of the machining gap 16. Further, the command signal control 22 is responsive to the retract signal for producing command signals to the digital drive circuit 24 to move the tool 10 away from the workpiece 12 a number of the predetermined increments thereby increasing the magnitude of the machining gap 16. Finally, the command signal control 22 produces a control signal to the power supply 10 which is operative to terminate the operation thereof in response to the retract signal.

FIGS. 2a and 2b when joined along the indicated junction line comprise a detailed block diagram of one embodiment of applicant's invention. Referring to FIG. 2a, the power supply 10 is of a relatively standard construction. An oscillator 28 applies low power pulses having a pulse duration or ON time and a duration between pulses or OFF time for controlling the pulse width and frequency of voltage pulses on the power supply output. Power switching circuits shown at 32 are operative to switch an output of a DC source 30 in response to the low power pulses from the oscillator 28 thereby producing voltage pulses from the power supply 10. A switching circuit 34 is shown connected to the oscillator 28. The function of the switching circuit 34 is to terminate the output of voltage pulses from the power supply 10. There are many possible placements of a switch within the power supply 16 to achieve this purpose. Consequently, the placement shown by applicant is not critical to the invention. There is one deviation in the power supply which is not standard within the power switching circuits 32. One of the parallel legs comprised of transistor 36 and resistor 38 is included only for sampling purposes. The resistor 38 is very large compared to the inductance in the discharge path. Consequently, the time constant through the sampling leg is much less than in the other parallel legs, and the rise time of current therethrough will be much faster. Therefore, detection of a current pulse from the power supply is facilitated. The current pulses through resistor 38 are detected by monitoring the output lines 40 and 42 from the power supply. The voltage pulses are produced on lines 42 and 44 which are connected to the tool and workpiece respectively.

A voltage detector 46, within the detection circuit 18, is connected to the output lines 42 and 44 for detecting a voltage pulse from the power supply 10. Similarly, a current detector 48 is operative to detect a current pulse from the power supply. The detectors 46 and 48 are connected to isolation interfaces 52 and 50, respectively. The purpose of the interfaces 50 and 52 is to isolate the electrical noise on the output of the power supply from the control circuits and to provide appropriate signal levels for logic in other control circuits. If a voltage pulse is in the one state, the voltage detector 46 and interface 52 will produce a voltage detection pulse on the output line 54. Likewise, if a current pulse is in the one state, the current detector 48 and interface 50 will produce a current detection pulse on the output line 56. These signals are inputs to a gating network 58 within the command signal generator 20.

The gating network 58 produces a first pulse on line 60 in response to the occurrence of only a voltage detection pulse. The gating network produces a second pulse on line 62 in response to the occurrence of only a current detection pulse. A counter circuit 66 is responsive to the first pulse for counting the number of consecutive exclusive occurrences of the voltage detection pulse. The counter circuit 66 is responsive to the second pulse for resetting the counting process. When the counter detects a predetermined number of consecutive occurrences of the first pulse, an advance signal is produced therefrom. A second similar counter circuit 70 is responsive to the second pulse for counting the number of consecutive exclusive occurrences of the current detection pulse and is responsive to the first pulse for resetting the counting process. When the counter circuit 70 counts a predetermined number of consecutive occurrences of the second pulse, a retract signal is output therefrom. The above counter circuits are comprised of standard elements, and the configurations are well-known to those who are skilled in the art. Typically, a counter is comprised of a plurality of serially connected storage devices or flip flops. A decoding gate is connected to the storage devices for producing an output in response to a unique binary signal contained therein which represents a particular numerical value. The use of the counter circuits is one of the key elements of applicant's invention. The first and second pulses from the gating network represent respectively an open circuit error condition and a short circuit error condition. As mentioned earlier, these conditions may occur during one or a very few number of voltage and current pulses and then disappear. In contrast to the prior art, applicant gives the process an opportunity to correct itself. The size of the counter is a function of the frequency of the voltage pulses. Under general machining conditions, with power supplies presently available, the counter circuit should be set to count from four to six pulses before an output is generated. However, at higher machining frequencies, more machining pulses will occur before the process corrects itself. Therefore, when machining frequencies are close to the megacycle region, the counter circuit should be set to count from eight to 10 pulses before an output is generated. Therefore, depending on the frequency, the counter circuit 66 will typically count from three to eight consecutive voltage detection pulses before an advance signal is produced; and the counter circuit 70 will typically count from three to 10 consecutive current detection pulses before a retract signal is produced. As with the counters themselves, the ability to make a counter selectively responsive to a number of different counts is well within the skill of those who are experienced in digital logic design. One further point regarding the late discharge phenomenom should be noted. The configuration of the reset circuit makes the counters insensitive to delay discharges. Therefore, when this occurs, the process will realize the benefits of the discharge instead of taking valuable machining time for corrective action.

The advance signal from the counter 66 is an input to a monostable multivibrator 74 within the command signal control 22 shown in FIG. 2b. The multivibrator 74 produces a command pulse which is an input to a storage device 78. The storage device 78 may typically be a logic flip flop and is operative to produce a sense signal to the stepping motor drive circuit 25 representing the direction of travel of the tool 12 with respect to the workpiece 14. The command pulse from the multivibrator 74 representing a predetermined increment of motion, passes through the gating network 76 and is input to the stepping motor drive circuit 25. Therefore, in response to an advance signal, the stepping motor drive circuit 25 commands the stepping motor 27 to move the tool 12 a predetermined increment toward the workpiece 14 thereby decreasing the magnitude of the machining gap 16.

The retract signal from the counter circuit 70 passes through a gating networks 80 and 89 and is stored in a storage devices 82 and 90 which again may typically be logic flip flops. A constant level output of the storage device 82 drives an integrating amplifier 84 which produces an output signal appearing as a ramp function having a positive slope. The output of the amplifier 84 is an input to a voltage controlled oscillator 86 which produces a plurality of pulses increasing in frequency as a function of the ramp input. The output of the storage device 82 is another input to the storage device 78 which in response thereto provides an opposite sense signal to the stepping motor drive circuit 25. A plurality of command pulses pass through the gating network 76 and into the stepping motor drive circuit 25; and hence, the tool 12 is moved away from the workpiece 14.

A counter circuit 88, similar to the earlier described counter circuits, is also responsive to the command pulses; and when a predetermined count is reached, a first output signal is produced therefrom which passes through the gating network 80 into the storage device 82. The output from the storage device 82 is switched back to its original state and the input is removed from the integrating amplifier 84. Consequently, the output of the amplifier 84 is a signal appearing as the ramp function but with a negative slope; and hence, the voltage controlled oscillator 86 produces command pulses in decreasing frequency to zero. This configuration permits the stepping motor to safely move the tool 12 with acceleration and then decelerate to stop a predetermined number of increments without losing command pulses. With this configuration, the counter circuit 88 must be set to decode a number which is equal to one-half the desired predetermined number of increments. When this number is decoded, a first output from the counter circuit 88 is an input to the gating network 80. Therefore, in response to a retract signal, the stepping motor drive circuit commands the stepping motor 27 to move the tool with an acceleration followed by a deceleration a plurality of predetermined increments away from the workpiece thereby increasing the magnitude of the machining gap 16. Also responsive to the retract signal is a storage device 90 which produces a control signal on an output which is connected to the switching circuit 34 shown in FIG. 2a. Therefore, immediately upon a retract signal being generated, the control signal from the storage device 90 energizes the switching circuit 34. Upon energization, the switching circuit 34 disconnects the oscillator circuit 28 from the power switching circuit 32, and the supply of voltage pulses is terminated from the power supply 10. At the end of the deceleration span, when the tool has moved the full number of increments, a second decoder within the counter circuit 88 produces a second output signal through the gating network 89 to the storage device 90. This output signal switches the storage device back to its original state and is operative to close the switching circuit 34 thereby restoring the supply voltage pulses from the power supply 10. The above described method of servomechanism control is the second key element to applicant's invention. The prior art devices do not distinguish in the magnitude of the corrective action taken. Applicant has discovered that if a short circuit condition exists, the most effective remedy is to immediately withdraw the tool at the greatest possible acceleration a predetermined distance from the workpiece. This permits a flushing action by the dielectric of the machining gap. Applicant has also discovered that it is best, at this point, to reinitiate the application of voltage pulses; and it is not unusual for electrical discharges to occur with the tool retracted from the workpiece.

FIG. 3 is a detailed schematic diagram of several elements shown in the preferred embodiment. During a discharge, current in the sampling leg of the power switching circuits 32 will produce a voltage drop across resistor 38 shown in FIG. 2a. This potential is connected to an input of an operational amplifier 92 which operates as a high speed comparator. Another input to the amplifier 92 contains a reference voltage that is produced from the potentiometer 94 which with resistor 96 constitutes a voltage divider circuit around zener diode 98. The zener diode 98 is held in its breakdown condition thereby providing a constant voltage source for the divider resistors 94 and 96. Therefore, as soon as the voltage drop across resistor 38 has a magnitude in excess of the reference voltage, the amplifier 92 switches state and produces an output signal. This output signal is reflected through the capacitor 98 within the interface 50, passes through the diode 100 and appears as a trigger on the input of a monostable multivibrator 102. The multivibrator 102 produces a very sharp pulse for a short duration which drives transistor 104 into conduction for the same short duration. A current pulse flows through transistor 104 into a primary winding 106 of a isolation transformer 108. This pulse is induced into a secondary winding 110 providing a trigger signal to a monostable multivibrator 112. The multivibrator 112 produces a current detection pulse on an output of the interface 50 indicating the presence of a current pulse. When a voltage pulse is produced from the power supply 10, a current flow exists through the resistors 114 and 115. The potential drop across resistor 114 is applied to the input 116 of an operational amplifier 118 which is also used as a comparator. The zener diode 120 across the resistor 114 is to protect the amplifier 118 from excessive voltages on its input 116. The resistor 115 protects the zener diode 120 from excessive currents. The resistor 122, 124 and 126 and zener diode 128 provide a reference signal in a similar manner to that earlier described in the current detector. Whenever a voltage pulse on input 116 exceeds the reference signal on input 130, the amplifier 118 produces an output from the detector 146. The isolation interface 52 is identical in construction and operation to the isolation interface 50 and produces a voltage detection pulse whenever a voltage pulse from the power supply is in the one state.

Figure 4:
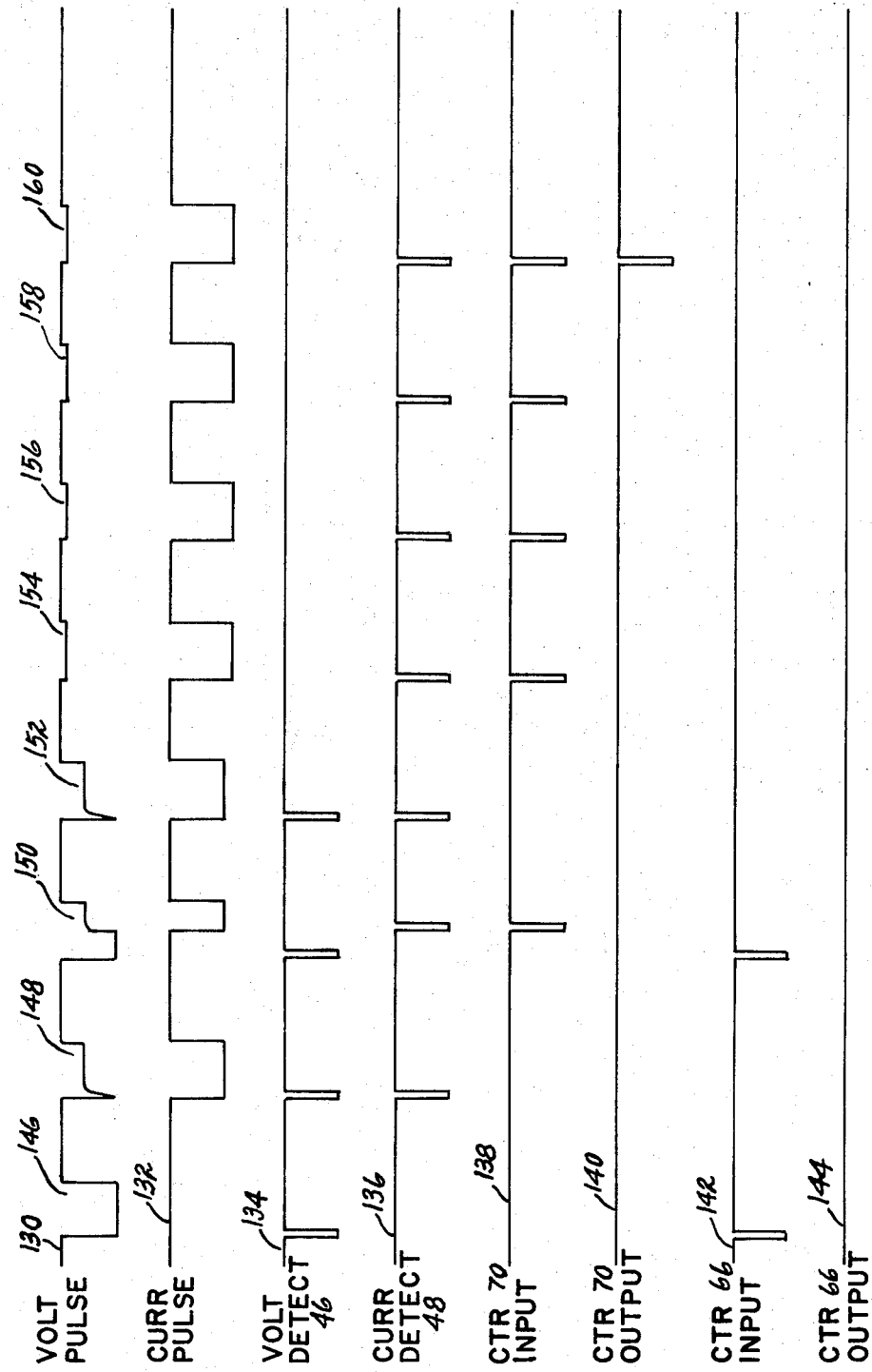
FIG. 4 is a timing diagram of signals occurring at the various points in the disclosed circuit in response to a number of special conditions in the machining gap.

FIG. 4 is a timing diagram illustrating pulse signals at various points in the circuit. The curves 130 and 132 illustrate voltage pulses and current pulses respectively that occur at the machining gap. Curves 134 and 136 illustrate respectively the voltage detection pulses and the current detection pulses from the detection circuit 18. Next, curves 138 and 140 represent the input and output respectively of the counter circuit 70. Finally, curves 142 and 144 represent the input and output respectively of the counter circuit 66.

The presence of a voltage pulse 146 and absence of a corresponding current pulse defines an open circuit condition. In this case, a voltage detection pulse is produced from a detection circuit 18 and the counter circuit 66 counts one increment. However, if the next voltage pulse 148 ionizes the gap and produces a corresponding current pulse, both a voltage detection pulse and a current detection pulse will be produced by the detection circuit 18; and the current detection pulse is operative to reset the counter circuit 66. The next voltage pulse 150 is illustrative of a delayed discharge. The voltage is applied to the gap a significant period of time before ionization takes place, and an abbreviated current pulse is produced. Even though the current pulse is abbreviated, valuable machining will occur. Again, in this case, a voltage detection pulse and a current detection pulse will be produced by the detection circuit. In this case, since the detection pulses do not occur simultaneously, the counter circuits will be responsive to each of the pulses. However, since the current detection pulse occurs later in time, it is operative to reset the counter circuit 66. It should be noted that if another delayed discharge occurs or if a normal discharge occurs, the counter circuit 70 will be reset; and consequently, the circuit is completely insensitive to the effects of the delayed discharge. This is illustrated by the voltage pulse 152 which produces a normal ionization of the machining gap and a full current pulse. Again, voltage and current detection pulses are simultaneously produced, and the counters 66 and 70 are both reset. The voltage pulses 154 through 160 illustrate a short circuit error condition. In each case, a full current pulse is produced as well as a current detection pulse. However, in the absence of a voltage pulse, no voltage detection pulse is produced from the detection circuit 18. An input to the counter circuit 70 is defined by each current detection pulse; and after the counter circuit counts a predetermined number of such pulses, a retract signal is produced therefrom. For example, if the counter 70 is set to 4, a retract signal will occur as illustrated in response to the voltage pulse 160. It should be noted that the above curves are only illustrative of a number of possible special conditions in the machining gap. Other conditions that may exist may be readily analyzed in a manner similar to the above.

While the invention has been illustrated in some detail according to the preferred embodiments shown in the accompanying drawing, and while the preferred illustrated embodiments have been described in some detail, there is no intention to limit the invention to such detail. On the contrary, it is intended to cover all modifications, alterations and equivalents falling within the spirit and scope of the appended claims.

What is claimed is:

1. An apparatus for controlling a digital drive circuit connected to a digital driving mechanism for producing relative motion between an electrically conductive tool and an electrically conductive workpiece positioned to form a machining gap therebetween, said machining gap having current pulses periodically passed thereacross in response to voltage pulses being provided by a power supply, the apparatus comprising:
   a. means connected to the power supply for detecting the voltage and current pulses;
   b. means connected to the detecting means for generating
      1. an advance signal in response to a predetermined number of consecutive occurrences of only voltage pulses, and
      2. a retract signal in response to a predetermined number of consecutive occurrences of only current pulses; and
   c. means connected to the generating means, the digital drive circuit and the power supply for producing
      1. a first command signal being supplied to the digital drive circuit in response to the retract signal for moving the tool a predetermined number of digital increments away from the workpiece,
      2. a second command signal being supplied to the digital drive circuit in response to the advance signal for moving the tool a digital increment toward the workpiece, and
      3. a control signal being supplied to the power supply in response to the retract signal for terminating the supply of voltage pulses therefrom.

2. An apparatus for use on an EDM machine comprised in part of a digital drive circuit being responsive to the control circuit for energizing a digital driving mechanism to control the magnitude of a machining gap formed between an electrically conductive tool and an electrically conductive workpiece, said machining gap being supplied voltage pulses from a power supply containing an output switching circuit and a switching means for selectively initiating and terminating the supply of said voltage pulses, wherein the improvement comprises:
   a. means connected to the output switching circuit for detecting a voltage pulse and providing a voltage detection pulse as a function thereof;
   b. means connected to the output switching circuit for detecting a current pulse in response to a voltage pulse and providing a current detection pulse as a function thereof;
   c. means connected to the detecting means for generating an advance signal in response to the detection of an exclusive occurrence of a predetermined number of consecutive voltage pulses and a retract signal in response to the detection of an exclusive occurrence of a predetermined number of consecutive current pulses; and
   d. means having inputs connected to the generating means and outputs connected to the digital drive circuit and the switching means and producing 1. a first set of command signals being applied to the digital drive circuit in response to the retract signal for increasing the magnitude of the machining gap by a predetermined number of digital increments,
2. a second set of command signals being applied to the digital drive circuit in response to the advance signals for decreasing the size of the machining gap by a digital increment, and
3. a control signal for energizing the switching means to terminate the supply of voltage pulses for the duration of the first set of command signals.

3. The apparatus of claim 2 wherein the generating means comprises:
   a. a gating network responsive to the voltage and current pulses for providing
      1. a first pulse in response to the exclusive occurrence of a voltage pulse, and
      2. a second pulse in response to the exclusive occurrence of a current pulse;
   b. first means connected to the gating network and having a first input responsive to the first pulse for counting the occurrences of said first pulse, said first means having a reset input responsive to the second pulse and providing the advance signal in response to counting a predetermined number of consecutive occurrences of said first pulses; and
   c. second means connected to the gating network and having a first input responsive to the second pulse for counting the occurrences of said second pulse, said second means having a reset input responsive to the first pulse and providing the retract signal in response to counting a predetermined number of consecutive occurrences of said second pulses.

4. The apparatus of claim 3 wherein the producing means comprises:
   a. storing means connected to the switching means and responsive to the retract signal for producing a control signal, said control signal energizing the switching means for terminating the supply of voltage pulses;
   b. means connected to the digital drive circuit and responsive to the retract signal and the advance signal for producing the first set of command signals comprised of a direction signal and a number of digital signals, each digital signal representing a predetermined increment of motion of the digital driving mechanism, and the second set of command signals comprised of an inversion of the direction signal and one of the digital signals; and
   c. means connected to the storing means and responsive to the number of digital signals for counting the digital signals and producing an output signal being operative to terminate the control signal in response to counting a predetermined number of said digital signals.

* * * * *